(12) United States Patent
Driver et al.

(10) Patent No.: US 7,857,932 B1
(45) Date of Patent: *Dec. 28, 2010

(54) CURED IN PLACE LINER WITH EVERTED OUTER IMPERMEABLE LAYER AND METHOD OF MANUFACTURE

(75) Inventors: Franklin Thomas Driver, St. Charles, MO (US); Weiping Wang, Ballwin, MO (US)

(73) Assignee: INA Acquisition Corp., Wilmington, DE (US)

( * ) Notice: Subject to any disclaimer, the term of this patent is extended or adjusted under 35 U.S.C. 154(b) by 218 days.

This patent is subject to a terminal disclaimer.

(21) Appl. No.: 10/704,501

(22) Filed: Nov. 7, 2003

(51) Int. Cl.
 *B29C 53/48* (2006.01)
(52) U.S. Cl. ...................... 156/203; 138/98; 264/36.16; 118/419
(58) Field of Classification Search .................. 138/97, 138/98; 156/203; 264/36.16; 118/419
See application file for complete search history.

(56) References Cited

U.S. PATENT DOCUMENTS

| 2,428,943 | A |   | 10/1947 | Plummer, Jr. |        |
|-----------|---|---|---------|--------------|--------|
| 3,533,133 | A |   | 10/1970 | Meitinger    |        |
| 3,568,898 | A |   | 3/1971  | Griffin, Jr. |        |
| 3,729,359 | A |   | 4/1973  | Monsees      |        |
| 3,737,261 | A |   | 6/1973  | Hardesty     |        |
| 3,785,893 | A |   | 1/1974  | Rotondi      |        |
| 4,009,063 | A |   | 2/1977  | Wood         |        |
| 4,025,375 | A | * | 5/1977  | Leasure ............ | 156/79 |
| 4,064,211 | A |   | 12/1977 | Wood         |        |
| 4,081,303 | A | * | 3/1978  | Rogers et al. ........... | 156/192 |
| 4,135,958 | A |   | 1/1979  | Wood         |        |
| 4,182,262 | A |   | 1/1980  | Everson et al. |      |
| 4,366,012 | A |   | 12/1982 | Wood         |        |

(Continued)

FOREIGN PATENT DOCUMENTS

DE   4113002 A1   10/1992

(Continued)

OTHER PUBLICATIONS

International Search Report (PCT/US2004/036633), Mar. 4, 2005.

(Continued)

*Primary Examiner*—James F Hook
(74) *Attorney, Agent, or Firm*—Senniger Powers LLP

(57) ABSTRACT

A resin impregnated cured in place liner having an everted outer impermeable coating is provided. A roll of a continuous length of resin impregnable material is formed into a tube. An impermeable film or wrapping is formed into a tube about a tubular former, sealed and continuously everted about the inner tubular member travelling in an opposite direction so that the everted wrapping envelopes the inner tubular member. Alternatively, the inner tubular member may be passed into a stuffer tube having an impermeable tube thereon that is everted onto the moving tubular member to encapsulate the inner tubular member. The inner tubular member may be passed through an open resin impregnation tank to impregnate the impregnable material prior to everting the outer layer thereon. The inner tubular member may have an inner layer of impermeable material bonded thereto. It may be formed into a tube with the impermeable layer on the outside and continuously everted to place the impermeable layer on the inside of the tube.

9 Claims, 6 Drawing Sheets

U.S. PATENT DOCUMENTS

| | | | |
|---|---|---|---|
| 4,446,181 A | | 5/1984 | Wood |
| 4,456,401 A | | 6/1984 | Williams et al. |
| 4,714,095 A | | 12/1987 | Muller et al. |
| 4,778,553 A | * | 10/1988 | Wood .................. 156/287 |
| 4,786,345 A | | 11/1988 | Wood et al. |
| 5,163,481 A | * | 11/1992 | Catallo .................. 138/98 |
| 5,167,258 A | * | 12/1992 | Rice .................. 138/98 |
| 5,242,517 A | * | 9/1993 | Endoh .................. 156/92 |
| 5,285,741 A | | 2/1994 | Askin |
| 5,323,723 A | | 6/1994 | Askin |
| 5,388,616 A | * | 2/1995 | Muller et al. .................. 138/98 |
| 5,411,060 A | * | 5/1995 | Chandler .................. 138/98 |
| 5,474,823 A | * | 12/1995 | Kamiyama et al. ....... 428/36.91 |
| 5,477,887 A | * | 12/1995 | Catallo .................. 138/97 |
| 5,653,555 A | | 8/1997 | Catallo |
| 5,778,938 A | | 7/1998 | Chick et al. |
| 6,024,910 A | * | 2/2000 | Kamiyama et al. .......... 264/516 |
| 6,105,619 A | * | 8/2000 | Kiest, Jr. .................. 138/98 |
| 6,254,709 B1 | * | 7/2001 | Kamiyama et al. ............ 156/91 |
| 6,270,259 B1 | | 8/2001 | Burton |
| 6,270,289 B1 | | 8/2001 | Einhaus et al. |
| 6,270,599 B1 | | 8/2001 | Wood |
| 6,539,979 B1 | | 4/2003 | Driver |
| 6,562,426 B1 | * | 5/2003 | Kamiyama et al. ......... 428/36.9 |
| 6,612,340 B1 | | 9/2003 | Lause |
| 6,615,875 B2 | * | 9/2003 | Adolphs et al. ............... 138/98 |
| 6,708,729 B1 | | 3/2004 | Smith |
| 6,732,763 B2 | * | 5/2004 | Williamson et al. ........... 138/98 |
| 6,923,217 B2 | * | 8/2005 | Smith .................. 138/98 |
| 7,096,890 B2 | * | 8/2006 | Woolstencroft et al. ....... 138/98 |
| 7,238,251 B1 | * | 7/2007 | Driver et al. ................ 156/203 |
| 2003/0015247 A1 | | 1/2003 | Driver et al. |
| 2003/0113489 A1 | | 6/2003 | Smith |
| 2003/0234056 A1 | * | 12/2003 | Woolstencroft et al. ....... 138/98 |
| 2005/0161100 A1 | * | 7/2005 | Pleydon et al. ................ 138/98 |
| 2006/0207726 A1 | * | 9/2006 | Driver et al. ................ 156/433 |

FOREIGN PATENT DOCUMENTS

| | | |
|---|---|---|
| EP | 0275060 A1 | 11/1988 |
| EP | 0 403 133 A | 12/1990 |
| EP | 0 542 639 A | 5/1993 |
| EP | 0454309 B2 | 4/2003 |
| GB | 1601234 A | 10/1981 |
| JP | 06234158 A | 8/1994 |
| JP | 06246832 A | 9/1994 |
| JP | 2001116165 A | 4/2001 |
| JP | 2002086565 A | 3/2002 |
| JP | 2002144428 A | 5/2002 |
| JP | 2002225136 A | 8/2002 |
| RU | 2097196 C1 | 11/1997 |
| WO | WO 8704226 A1 | 7/1987 |
| WO | WO 98/31964 A | 7/1988 |
| WO | WO 90/11175 A | 10/1990 |
| WO | WO 91/18234 A | 11/1991 |
| WO | WO 01/77569 A | 10/2001 |
| WO | WO 02/064351 A | 8/2002 |
| WO | WO 03/038331 A | 5/2003 |
| WO | WO 03/069211 A | 8/2003 |

OTHER PUBLICATIONS

International Search Report (PCT/US2004/036625), Apr. 19, 2005.
International Search Report (PCT/US2004/036629), Apr. 12, 2005.
International Search Report (PCT/US2004/036621), Apr. 13, 2005.
International Search Report (PCT/US2004/036628), Mar. 31, 2005.
Machine Translation of WO 87/04226 Obtained by Examiner from babelfish.com on Apr. 14, 2006.
Office Action mailed Apr. 20, 2006 in U.S. Appl. No. 10/704,461 and PTO 1449 (4 pages) and PTO-892.
Office Action mailed Dec. 13, 2006 in U.S. Appl. No. 10/704,461.
Office action issued Sep. 26, 2008 in related U.S. Appl. No. 11/439,089, 9 pgs.
Response filed Feb. 25, 2009 to Office Action dated Sep. 26, 2008 from related U.S. Appl. No. 11/439,089, 12 pgs.
Office action issued Apr. 14, 2009 in related U.S. Appl. No. 11/439,089, 9 pgs.
Response filed Oct. 14, 2009 to Office Action dated Apr. 14, 2009 from related U.S. Appl. No. 11/439,089, 8 pgs.
Office action issued Nov. 25, 2009 in related U.S. Appl. No. 11/439,089, 7 pgs.

* cited by examiner

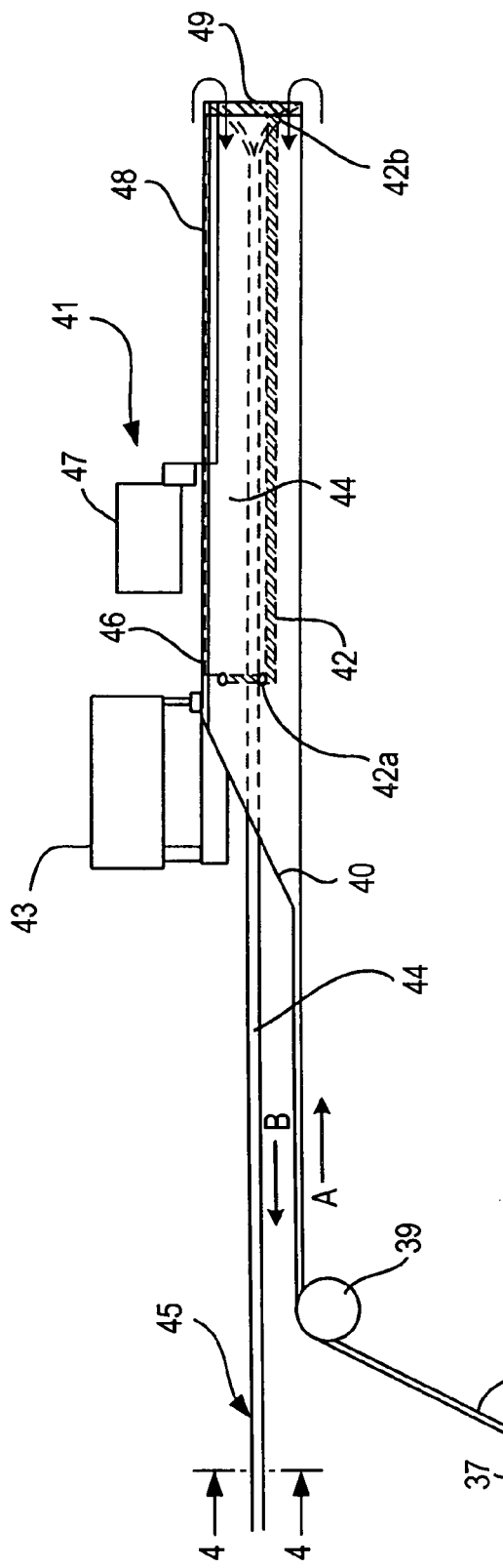
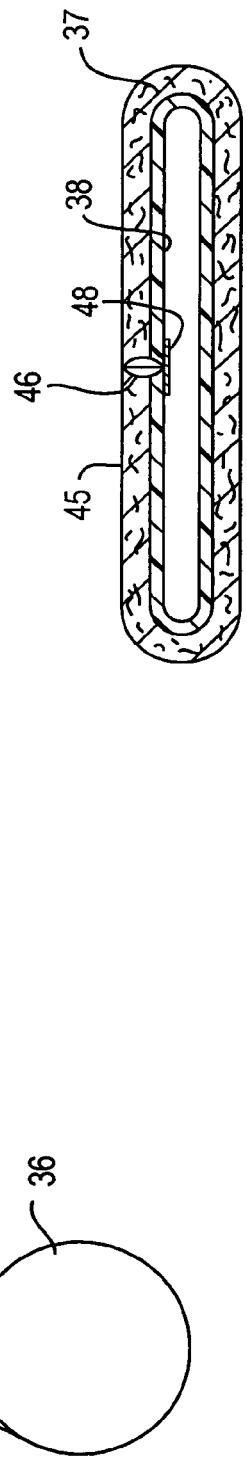
FIG. 3
FIG. 4

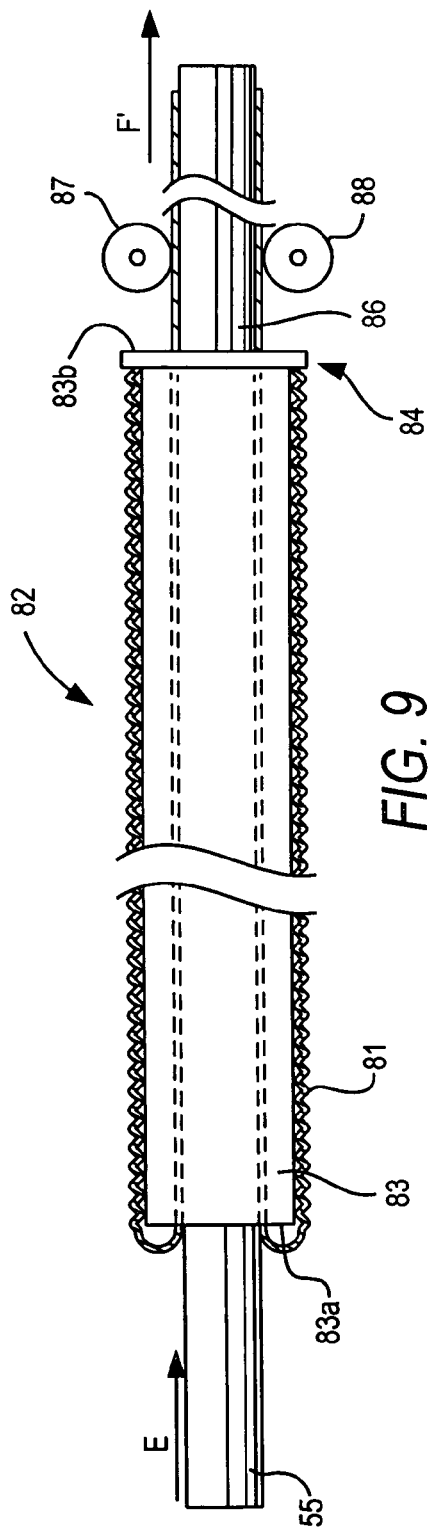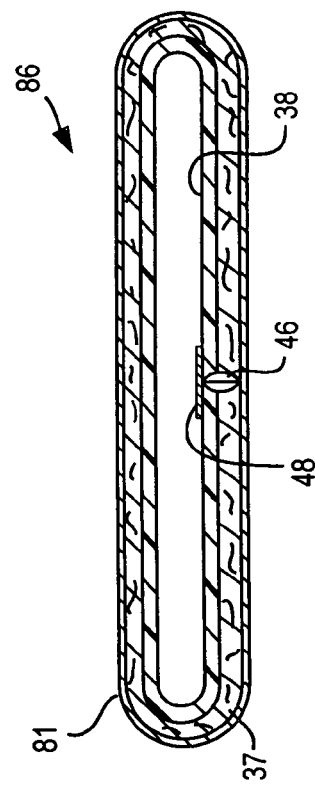

CURED IN PLACE LINER WITH EVERTED OUTER IMPERMEABLE LAYER AND METHOD OF MANUFACTURE

BACKGROUND OF THE INVENTION

This invention relates to cured in place liners for trenchless rehabilitation of existing conduits and pipelines, and more particularly to a cured in place liner of a resin impregnable material with an everted outer impermeable coating or wrapping continuously manufactured in lengths suitable for trenchless rehabilitation of existing conduits by pulling in and inflating.

It is generally well known that existing conduits and pipelines, particularly underground pipes, such as sanitary sewer pipes, storm sewer pipes, water lines and gas lines that are employed for conducting fluids frequently require repair due to fluid leakage. The leakage may be inward from the environment into the interior or conducting portion of the pipelines. Alternatively, the leakage may be outward from the conducting portion of the pipeline into the surrounding environment. In either case of infiltration or exfiltration, it is desirable to avoid this type of leakage.

The leakage in the existing conduit may be due to improper installation of the original pipeline, or deterioration of the pipe itself due to normal aging, or the effects of conveying corrosive or abrasive material. Cracks at, or near pipe joints may be due to environment conditions such as earthquakes, or the movement of large vehicles on the overhead surface, or similar natural or man-made vibrations, or other such causes. Regardless of the cause, such leakages are undesirable and may result in waste of the fluid being conveyed within the pipeline, or result in damage to the surrounding environment and possible creation of dangerous public health hazards. If the leakage continues it can lead to structural failure of the existing conduit due to loss of soil and side support of the conduit.

Because of ever increasing labor and machinery costs, it is increasingly more difficult and less economical to repair underground pipes or portions that may be leaking by digging up the existing pipe and replacing the pipe with a new one. As a result, various methods have been devised for the in place repair or rehabilitation of existing pipelines. These new methods avoid the expense and hazards associated with digging up and replacing the pipe or pipe sections, as well as the significant inconvenience to the public during construction. One of the most successful pipeline repair or trenchless rehabilitation processes that is currently in wide use is called the Insituform® Process. The Insituform Process is described in detail in U.S. Pat. No. 4,009,063, U.S. Pat. No. 4,064,211 and U.S. Pat. No. 4,135,958, the contents of which are all incorporated herein by reference.

In the standard practice of the Insituform Process an elongated flexible tubular liner of a felt fabric, foam or similar resin impregnable material with an outer impermeable coating that has been impregnated with a thermosetting curable resin is installed within the existing pipeline. In the most widely practiced embodiment of that process, the liner is installed utilizing an eversion process, as described in the '211 and '958 Insituform patents. In the eversion process, radial pressure applied to the interior of an everted liner presses it against and into engagement with the inner surface of the pipeline as the liner unfolds along the length of the pipeline. The Insituform Process is also practiced by pulling a resin impregnated liner into the conduit by a rope or cable and using a separate fluid impermeable inflation bladder or tube that is everted within the liner to cause the liner to cure against the inner wall of the existing pipeline. Such resin impregnated liners are generally referred to as "cured-in-place-pipes" or "CIPP liners" and the installation is referred to a CIPP installation.

Conventional cured in place flexible tubular liners for both the eversion and pull-in-and-inflate CIPP installations have an outer smooth layer of relatively flexible, substantially impermeable polymer coating in its initial state. The outer coating allows a resin to be impregnated into the inner layer of resin impregnable material, such as felt. When everted, this impermeable layer ends up on the inside of the liner with the resin impregnated layer against the wall of the existing pipeline. As the flexible liner is installed in place within the pipeline, the pipeline is pressurized from within, preferably utilizing an eversion fluid, such as water or air to force the liner radially outwardly to engage and conform to the interior surface of the existing pipeline. Cure of the resin is initiated by introduction of hot curing fluid, such as water into the everted liner through a recirculation hose attached to the end of the everting liner. The resin impregnated into the impregnable material then cures to form a hard, tight fitting rigid pipe lining within the existing pipeline. The new liner effectively seals any cracks and repairs any pipe section or pipe joint deterioration in order to prevent further leakage either into or out of the existing pipeline. The cured resin also serves to strengthen the existing pipeline wall so as to provide added structural support for the surrounding environment.

When tubular cured in place liners are installed by the pull-in-and-inflate method, the liner is impregnated with resin in the same manner as in the eversion process and pulled into and positioned within the existing pipeline in a collapsed state. In a typical installation, a downtube, inflation pipe or conduit having an elbow at the lower end is positioned within an existing manhole or access point and an everting bladder is passed through the downtube, opened up and cuffed back over the mouth of the horizontal portion of the elbow and inserted into the collapsed liner. The collapsed liner within the existing conduit is then positioned over and secured to the cuffed back end of the inflation bladder. An everting fluid, such as water, is then fed into the downtube and the water pressure causes the inflation bladder to push out of the horizontal portion of the elbow and cause the collapsed liner to expand against the interior surface of the existing conduit. The eversion of the inflation bladder continues until the bladder reaches and extends into the downstream manhole or second access point. At this time the liner pressed against the interior surface of the existing conduit is allow to cure. Cure is initiated by introduction of hot curing water introduced into the inflation bladder in much the same manner as the recirculation line tied to the end of the everting bladder to cause the resin in the impregnated layer to cure.

After the resin in the liner cures, the inflation bladder may be removed or left in place in the cured liner. Both the pull-in and inflate method as well as the eversion method typically require man-access to restricted manhole space on several occasions during the process. For example, man-access is required to secure the everting liner or bladder to the end of the elbow and insert it into the collapsed liner.

Regardless of how the liner is to be installed a curable thermosetting resin is impregnated into the resin absorbent layers of a liner by a process referred to as "wet-out." The wet-out process generally involves injecting resin into resin absorbent layers through an end or an opening formed in the outer impermeable film, drawing a vacuum and passing the impregnated liner through nip rollers as is well known in the lining art. A wide variety of resins may be used, such as polyester, vinyl esters, epoxy resins and the like, which may be modified as desired. It is preferable to utilize a resin which is relatively stable at room temperature, but which cures readily when heated with air, steam or hot water, or subjected to appropriate radiation, such as ultra-violet light.

One such procedure for wetting out a liner by vacuum impregnation is described in Insituform U.S. Pat. No. 4,366,012. When the liner has inner and outer impermeable layers, the tubular liner may be supplied flat and slits formed on opposite sides of the flattened liner and resin injected and on both sides as described in the '063 Patent. Another apparatus for wetting out at the time of installation while drawing a vacuum at the trailing end of the liner is shown in U.S. Pat. No. 4,182,262. The contents of each of these patents are incorporated herein by reference.

Recent efforts have been made to modify the pull-in and inflate method to utilize air to evert a bladder into the pulled-in liner from a proximal access point. When the everting bladder reaches the distal access point, steam is introduced into the proximal access point to initiate cure of the resin impregnated into the resin impregnable layer. This process offers the advantage of faster cure due to the increased energy carried by the steam as the curing fluid. However, the process still requires eversion of a bladder into the pulled-in impregnated liner. Efforts to avoid this step of everting the bladder into the pulled-in liner include performing the eversion step above ground. For example, in U.S. Pat. No. 6,270,289, the process includes everting a calibration hose into a flat-lying lining hose above ground prior to pulling the hose assembly into the existing conduit. This process avoids the eversion below grade, but is severely limited into the length of lining that can be laid out above ground prior to pulling-in.

A further suggestion to avoid this eversion is to manufacture a liner having an inner coating and an outer coating so that a curing fluid can be introduced directly into a pulled-in liner. The disadvantages here involves the difficulty faced when trying to impregnate the resin impregnable material disposed between the inner and outer impermeable coatings. The outer coating remains essential for handling the impregnated liner and to allow the liner to be pulled into the existing conduit and the inner coating is desired to all allow for curing with the steam.

Notwithstanding recent improvements in both the eversion and pull-in and inflate trenchless rehabilitation methods, both processes are labor intensive, require an eversion step and suffer from the increased costs associated with this. Accordingly, it is desirable to provide a liner manufactured with inner and outer impermeable coatings that can be readily impregnated to allow for curing by steam as the curing fluid to take advantage of the energy available to provide an installation method which is faster and more efficient economically than current rehabilitation methods.

SUMMARY OF THE INVENTION

Generally speaking, in accordance with the invention, a resin impregnated cured in place liner with an inner tube of resin impregnable material and an everted outer impermeable coating suitable for pull-in and inflate rehabilitation of existing pipelines is provided. The liner may have an inner impermeable layer continuously formed from a length of a resin absorbent material having bonded thereto on one surface an impermeable layer formed into an inner tubular member and sealed with the impermeable layer on the inside of the tube. Alternatively, a tube of resin impregnable material may be formed about a continuous tube of an impermeable layer. The resin impregnable tube may then be wrapped with additional layers of resin impregnable material, secured into tubular form, impregnated with a thermosetting resin and wrapped with an outer resin impermeable coating and sealed. An outer impermeable coating or wrappings is applied to the tube by everting a tube of impermeable material onto the inner tubular member as it is fed into a tubular stuffer. The outer coating may be a previously formed tube or continuously formed and sealed prior to being everted over the inner tubular member.

Accordingly, it is an object of the invention to provide an improved method of cured-in-place rehabilitation of existing pipelines.

Another object of the invention is to provide an improved liner for cured in place rehabilitation of an existing pipeline.

A further object of the invention is to provide an improved liner of resin impregnable material having an inner impermeable layer and an outer impermeable layer that has been everted over the resin impregnable inner tube suitable for trenchless rehabilitation of existing pipelines.

Yet another object of the invention is to provide an improved method of continuously manufacturing a resin impregnated cured in place liner having an everted outer impermeable layer.

Yet a further object of the invention is to provide a method of manufacturing a resin impregnated cured in place liner having inner and outer impermeable layers for pull-in and inflate trenchless pipeline installation.

Still other objects and advantages of the invention will in part be obvious and will in part be apparent from the specification.

The invention accordingly comprises the several steps and the relation of one or more of such steps with respect to each of the others, the apparatuses embodying features of construction, combinations and arrangement of parts that are adapted to effect such steps, and the products that possess the characteristics, features, properties, and the relation of components, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawing(s), in which:

FIG. 3 is a schematic view of the apparatus used for preparing the inner portion of the liner having an outer felt layer with an inner high temperature polymeric layer used in connection with preparation of the cured in place liner of FIG. 2;

FIG. 4 is a cross-sectional view showing the structure of the inner portion of the liner produced by the apparatus of FIG. 3 before being impregnated in accordance with the invention;

FIG. 9 is a schematic in elevation showing wrapping of the tubular member exiting a resin impregnation apparatus with an outer coating by passing the wet out liner through a tube stuffer having a tubular wrapping stored thereon; and FIG. 10 is a cross-section of a liner wrapped by the apparatus of FIG. 9.

DESCRIPTION OF THE PREFERRED EMBODIMENTS

A resin impregnated cured in place liner prepared in accordance with a preferred embodiment of the invention has an integral inner lining so that is can be installed by the pull-in-and-inflate method and inflated and cured with a heated fluid without the use of an inflation bladder. The impregnated liner with inner impermeable polymer layer is continuously prepared in desired lengths. It may be impregnated as it is assembled in view of the increased effort necessary to impregnate a flattened liner having a resin absorbent material between an inner and an outer coating using convention vacuum impregnation technology.

This increased effort is necessary evidenced by the process suggested in U.S. Pat. No. 6,270,289. Here, above ground a calibration hose is inverted into a flat-lying impregnated lining hose, or an impregnated lining hose is inverted into a tubular film using compressed air. In this case, the length of the lining hose approximates the length of the underground conduit to be lined. The inversion of one tube inside the other requires an unobstructed length equal to the length of the longest layer. If the two layers had not been previously impregnated, it would be necessary to inject resin between the layers on both sides of the lay flat tubes in order to provide adequate impregnation. This is a difficult and inefficient way to impregnate lining tubes. Thus, not only is the length restricted, but also the impregnation is extremely difficult.

Figure 1:
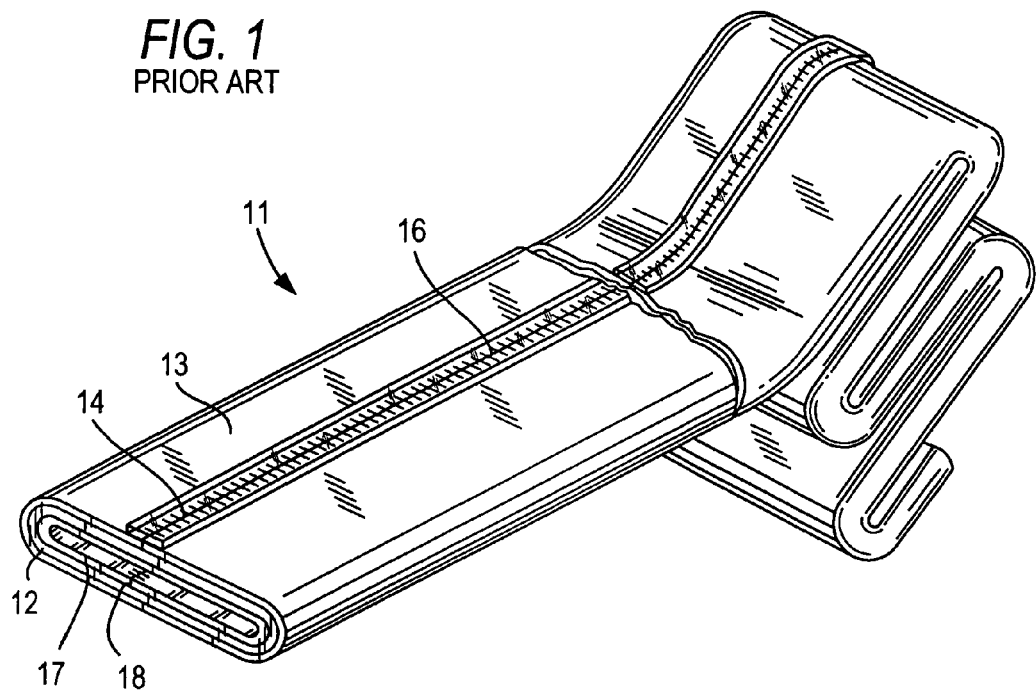
FIG. 1 is a perspective view of a length of a typical resin impregnable cured in place liner suitable for use in lining an existing pipeline of the type generally in use today and well known in the art.

FIG. 1 illustrates a flexible cured in place liner 11 of the type generally in use today and well known in the art. Liner 11 is formed from at least one layer of a flexible resin impregnable material, such as a felt layer 12 having an outer impermeable polymer film layer 13. Felt layer 12 and outer polymer layer 13 are stitched along a seam line 14 to form a tubular liner. A compatible thermoplastic film in a form of a tape or extruded material 16 is placed on or extruded over seam line 14 in order to ensure the impermeability of liner 11. In the embodiment illustrated in FIG. 1 and used throughout this description, liner 11 includes an inner tube of a second felt layer 17 also stitched along a seam line 18 positioned at a point in the tube other than the location of seam line 14 in outer felt layer 12. Outer felt layer 12 with polymer layer 13 is then formed around inner tubular layer 17. After impregnation liner 11 in a continuous length is stored in a refrigeration unit to suppress premature cure of the resin. Liner 11 is then cut to a desired length after being pulled into the existing pipeline, or is cut prior to being everted into the existing pipeline.

Liner 11 of the type illustrated in FIG. 1 is impermeable to water and air. This will allow use in an air or water eversion as described above. However; in a pull in and inflate installation in accordance with the invention, the outer coating on the liner need only be sufficiently impermeable to allow for easy handling and retention of resin and to prevent damage to the liner as it is pulled into the existing pipeline.

For larger liner diameters, several layers of felt or resin impregnable material may be used. Felt layers 12 and 17 may be natural or synthetic flexible resin absorbable material, such as polyester, acrylic polypropylene, or inorganic fibers such as glass and carbon. Alternatively, the resin absorbent material may be a foam. Impermeable film 13 may be a polyolefin, such as polyethylene or polypropylene, a vinyl polymer, such as polyvinyl chloride, or a polyurethane as is well known in the art. Any form of sewing, adhesive bonding or flame bonding, or any other convenient means can be used to join the material into tubes. In the initial step in all trenchless rehabilitation installations, the existing pipeline is prepared by cleaning and videotaping.

Figure 2:
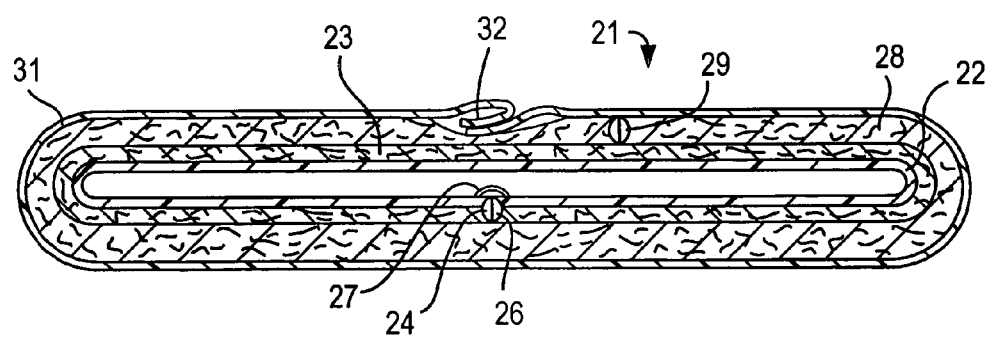
FIG. 2 is a cross-section view of a cured in place liner having an integral inner impermeable layer and an outer impermeable film or wrapping constructed and arranged in accordance with the invention.

Referring now to FIG. 2, a cured in place liner 21 prepared in accordance with the invention is shown in cross-section. Liner 21 similar to convention liner 11, but includes an inner impermeable layer 22 that has a thin felt or resin impregnable layer 23 bonded thereto. Inner felt layer 23 has been sewn along the longitudinal edges to form a seam line 24 by a row of stitches 26 and sealed with a tape 27 applied over stitches 26. An outer felt layer 28 is wrapped about inner thin felt layer 23 and formed into a tube by stitches 29. Finally, an outer layer or wrapping 31 is formed into a tube with an edge seal 32 and continuously everted over outer felt layer 28 so that an edge seal 32 is encapsulated under outer impermeable layer 31 as will be described in more detail below.

By manufacturing a liner in this manner, it is not necessary to evert the liner during installation or evert an inflation bladder after the liner has been pulled into the existing conduit. Thus, significant savings in labor cost at the time of installation are available. It also allows for use of a heated curing fluid such as steam to inflate and cure the resin. In such case all the heated fluids are introduced into the liner below grade level to provide a safer work environment.

Figure 8:
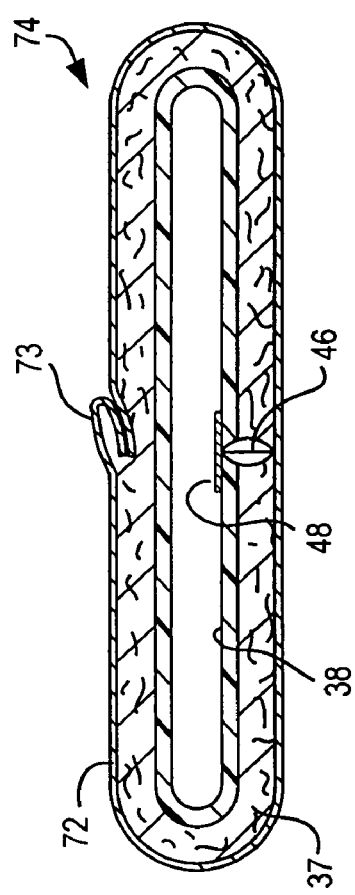
FIG. 8 is a cross-section of the liner prepared by the apparatus of FIG. 6.

Felt layers 23 and 28 may be impregnated in the usual manner using vacuum. Alternatively, felt layers 23 and 28 are first impregnated with resin and then an outer impermeable layer 31 is applied. This avoids the difficulty with impregnating a finished liner having felt layers between an inner and outer impregnable layer. In U.S. Pat. No. 4,009,063, Eric Wood proposed injecting resin in the felt layer using needles inserted into opposite sides of a flattened constructed liner. This operation requires cutting and patching needle holes in the outer coating. The vacuum impregnation process taught in U.S. Pat. No. 4,366,012 would not be suitable unless the vacuum is drawn on both sides as the inner coating is a barrier to resin flow in a liner with inner and outer coating. In order to overcome the impregnation difficulties, liner 21 is manufactured from endless rolls of flat coated and plain felt and continuously impregnated prior to application of outer wrapping 31. This may be accomplished by the method using the apparatuses illustrated in FIGS. 3, 5, and 6 resulting in a liner 74 as illustrated in FIG. 8.

While felt layers 23 and 28 are formed into tubes by stitching and/or taping, any of the conventionally known methods for forming felt or other resin impregnable material into tubes is suitable. For example, tubes can be formed by use of various glues or adhesives as well as flame bonding. Tape may be applied to inner impermeable layer 22 by applying an adhesive strip or extruding a layer of polymeric material in order to seal the butted edges of the felt material and the holes formed during a sewing operation.

Referring now to FIG. 3, a method for continuously forming a length of a tube or resin impregnable material with a sealed inner impermeable layer is shown. A roll of coated felt 36 having a continuous length of felt 37 with an impermeable layer 38 is fed over a directional roller 39 in flat form with coated side facing roller 39 to a tube forming device 41.

Tube forming device 41 includes a tubular support frame 42 having a proximal end 42a and a distal end 42b and a film deformer 40. A seaming device 43 that may be a sewing and taping machine, gluing machine or flame bonding apparatus is mounted above support frame 42. Felt 37 with impermeable layer 38 facing roller 39 is fed in the direction of an arrow A to the proximal end of tube forming device 41 where it is deflected by deflector 40 and wrapped around support frame 42 and seamed into a tube 44 along a seam line 46 with felt 37 on the inside and impermeable layer 38 on the outside. Tube 44 then passes a taping device 47 where a tape 48 is placed over seam line 46 to form an impermeable coated taped tube member 45.

Tube 44 then continues to travel along tubular support frame 42 to an inverter ring 49 at a distal end 42b of support frame 42. Taped tube 45 is then everted into tubular support frame 42 so that impermeable layer 38 is now on the inside of tube 45 as it is withdrawn from the proximal end 42a of tubular support frame 42 along a line defined by an arrow B. At this point everted tube 45 has the structure illustrated in cross-section in FIG. 4 with impermeable layer 38 on the inside and felt layer 37 on the outside. Tube 45 is then stored for further use or may be passed directly to a resin impregnation step as shown in FIG. 5 prior to final wrapping.

Figure 5:
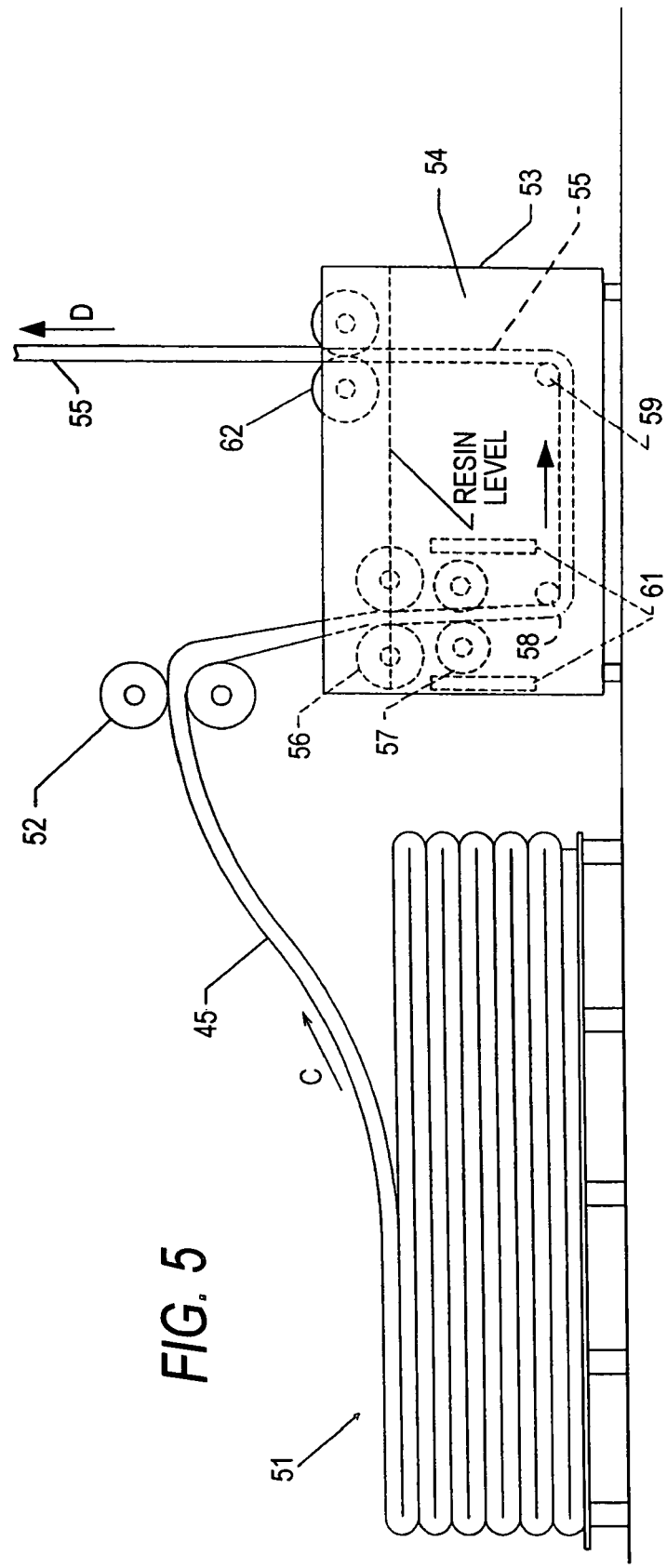
FIG. 5 is a schematic in elevation showing resin impregnation of the tubular member of FIG. 4 for preparing an impregnated CIPP liner in accordance with the invention.

FIG. 5 illustrates in schematic impregnation of a supply 51 of taped tube 45. Here, tube 45 is pulled in arrow direction C by or through a pair of rubber covered pulling rollers 52 into an open top resin tank 53 filled to a predetermined level with a curable thermoset resin 54 to form an impregnated or wet-out tube 55. Tube 45 passes between a first and second set of compression rollers 56 and 57 and around a first directional roller 58 to turn tube 45 in a horizontal direction and a second directional roller 59 to turn tube to a vertical direction. A sonic wave generator 61 may be utilized in lieu of or in addition to second compression rollers 57. Sonic wave generator 61 improves the impregnation of resin 54 into felt layer 37 of tube 45 as it passes through resin tank 53. After changing direction about second directional roller 59, impregnated tube 55 with resin passes between a pair of pneumatic calibration rollers 62. At this time, tube 55 then enters through a film wrapping and sealing station shown generally as 63 in the direction of arrow D.

Figure 6:
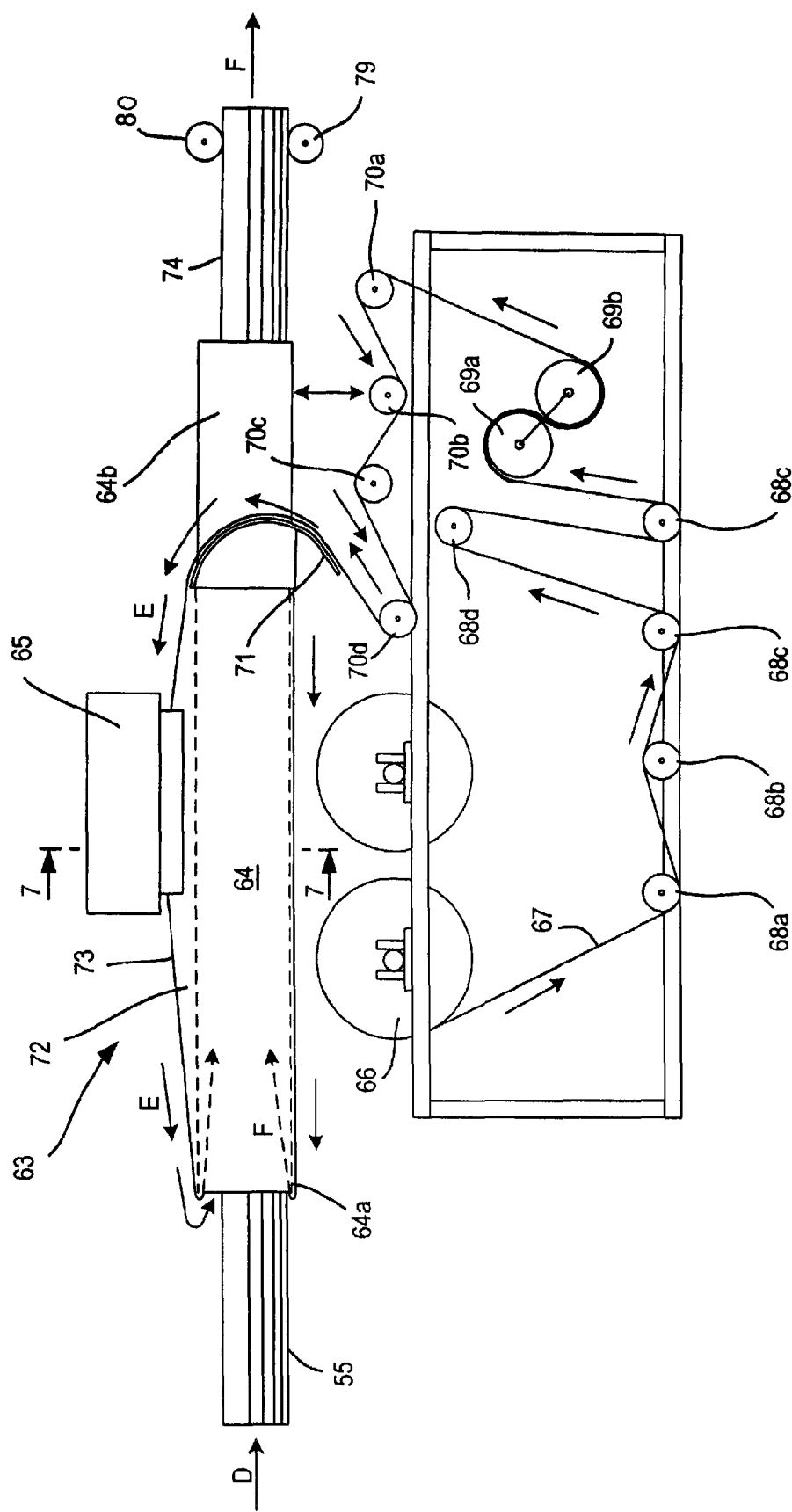
FIG. 6 is a schematic in elevation showing sealing and wrapping the impregnated tubular member exiting the resin bath in FIG. 5 with an outer coating with an edge seal placed on the inside of the outer coating in accordance with the invention.

Film wrapping and sealing station 63 shown in FIG. 6 includes a former pipe 64 having an inlet end 64a and an outlet end 64b and an edge sealer 65 positioned above the mid-section of former pipe 64. A roll 66 of a resin impermeable film material 67 that is to be wrapped about impregnated tube 55 fed into former pipe 64. Resin impermeable film material 67 is fed from roll 66 about a series of direction rollers 68a-e and pulled by a pair of drive rollers 69a and 69b as film 67 is fed over rollers 70a-d to former pipe 64. A deflector 71 at outlet end 64b of former pipe 64 directs film 67 about former pipe 64 prior to being fed into edge sealer 65 to form film 67 into a tube 72 with an edge seal 73 extending outwardly therefrom. Tube 72 of impermeable material moving along former pipe 64 is pulled in a direction indicated by an arrow E to inlet end 64a of former pipe 64 whereupon tube 72 is continuously everted into the interior of former pipe 64 and onto impregnated tube 55 and pulled in the opposite direction indicated by a dashed arrow F.

Impregnated tube 55 exiting open resin bath 54 is fed in the direction of arrow D into inlet end 64a of former pipe 64 and is enveloped by everting film tube 72. As film tube 72 is everted, edge seal 73 is displaced to the inside of tube 72 so that edge seal 73 is disposed between impregnated tube 55 and film tube 72. A wrapped wet-out CIPP liner 74 including wet-out tube 55 and everted film tube 72 is pulled out outlet end 64b of former pipe 64 by a pair of drive rollers 79 and 80. Alternatively, liner 74 may be withdrawn by a pair of tractors or a driven conveyor belt and fed to a refrigerated truck for storage and shipment to an installation site.

Figure 7:
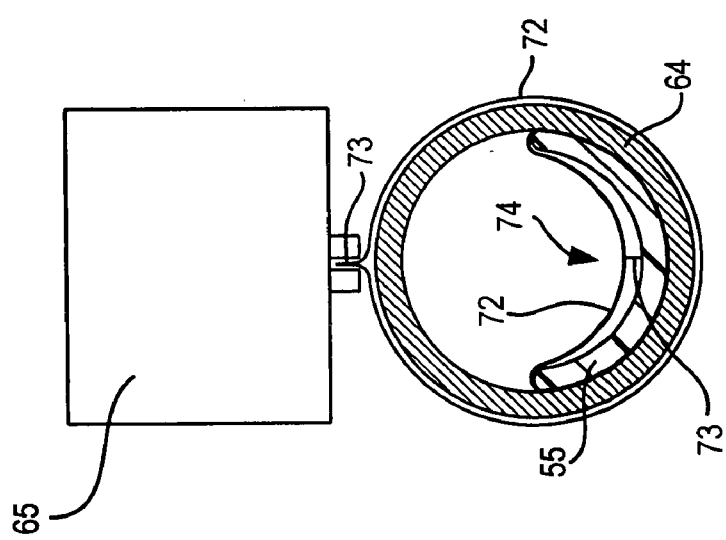
FIG. 7 is a cross-sectional view of the edge sealer in the sealing and wrapping apparatus of FIG. 6 taken along line 7-7.

Referring to FIG. 7, a cross-sectional view through edge sealer 65 and former pipe 64 along line 7-7 in FIG. 6 is shown. Edge sealer 65 forms edge seal 73 in film tube 72 as film tube 72 passes over the outside of former pipe 64. Once tube 72 is everted, edge seal 73 is now inside wrapped wet-out tube 74 as it is pulled from outlet end 64b of forming former pipe 64. Outer impermeable film 72 may be applied prior to or after wet-out. In the case where this is prior to wet out, tube 45 prepared as shown in FIG. 3 is fed directly to tube forming assembly 67 in FIG. 6 and provides liner 74 shown in cross-section in FIG. 8.

Referring now to FIG. 9 an alternative apparatus for wrapping an outer impermeable tube 81 about impregnated tube 55 is shown generally as 82. Here tube 45 may be impregnated in the same manner as described in connection with wet-out tank 53 in FIG. 5 and then tube 55 is fed into a stuffer pipe 83 having an inlet, end 83a and an outlet end 83b. Reference numerals as used in FIG. 5 are applied to identical elements here.

A supply of a flexible impermeable tube 81 is loaded onto the outside surface of stuffer pipe 83 having an inlet end 83a and an outlet end 83b. Impregnated tube 55 leaving resin tank 53 is fed into inlet end 83a of stuffer pipe 83. As tube 55 enters inlet end 83a of stuffer pipe 83, impermeable tube 81 is pulled off the outside of stuffer pipe 83 and everted about inlet end 83a into the inside of stuffer pipe 83 to envelope impregnated tube 55 as it leaves outlet end 83b. This forms a complete liner 86 having inner impermeable layer 38 and outer impermeable coating 81. Tube 86 with outer coating 81 is removed from outlet end 83b of stuffer tube 83 by a pair of drive rollers 87 and 88, or other pulling device such as tractors or a conveyor, in a direction of an arrow F'. When an extruded tube is used in this embodiment, there is no seam in outer impermeable coating 81. The sole limitation of preparing tube 86 in this manner is the length of impermeable tube 81 that can be placed on stuffer tube 83. It has been found that about 1,000 feet of an impermeable tube can be compressed onto a stuffer tube of about 20 feet in length. Longer lengths can be stored on longer stuffer tubes.

FIG. 10 is cross-section of liner 86 as it exits stuffer tube 83. Liner 86 includes inner tubular member of resin absorbent material 37 having an impermeable inner coating 38 sealed with a tape 48 as described in connection with FIG. 4. After exiting stuffer tube 83, liner 86 includes outer tubular wrapping 81. In view of the fact that tubular wrapping 81 is a previously extruded tube, outer wrapping 81 does not have any seams as in connection with FIGS. 6 and 8.

Once at the installation site, wrapped impregnated tube 74 or 86 having inner impermeable layer 38 and outer impermeable wrapping 72 or 81 is ready for installation by the pull-in-and-inflate method. This method is fully described in U.S. Pat. No. 4,009,063, the contents of which are incorporated herein by reference. In the case of installation by the pull-in-and-inflate method, a separate eversion bladder is not necessary to inflate the liner due to the presence of inner impermeable layer 38. By proper selection of materials for inner impermeable layer 38, such as polypropylene, inflation and curing can be done with steam introduced into liner 74 or 86 once in position in the existing conduit.

The processes and apparatuses described herein provide a convenient means to prepare a cured in place liner having both inner and outer impermeable layers. A tube forming and eversion apparatus as illustrated in FIG. 3 readily provides a method to prepare the inner portion of the finished tube with an impermeable layer on the inside of the tube and an outer felt layer. Additional layers of uncoated felt may be wrapped about the formed inner tube if desired.

An inner tubular member for a CIPP liner prepared in accordance with the process described in connection with FIG. 3 can be readily impregnated in an open top resin tank and enveloped within an impermeable wrapping as described in connection with the apparatus shown in FIG. 6 or in FIG. 9. By continuously forming an outer wrapping with an edge seal and continuously everting the sealed film tube about a wet-out tube, the seal is inverted provided a wrapped wet-out tube with a smooth outer surface ready for pull-in-and-inflate installation. Similarly, by everting a tube over the inner tube, a smooth outer surface is also presented to the conduit to be lined.

It will thus be seen that the objects set forth above, among those made apparent from the preceding description, are efficiently attained and, since certain changes may be made in carrying out the above process, in the described product, and in the construction(s) set forth without departing from the spirit and scope of the invention, it is intended that all matter contained in the above description and shown in the accompanying drawing(s) shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of preparation of a cured in place liner having an outer impermeable coating, comprising:
    providing a first tubular member of at least one layer of a resin impregnable material;
    providing a length of a material including at least a resin impermeable layer;
    feeding the first tubular member in a first direction about a tubular former;
    continuously forming the length of material including the resin impermeable layer into a second tubular member about the tubular former;
    simultaneously and continuously feeding the second tubular member along the tubular former in a direction towards the first tubular member and everting the second tubular member into the tubular former as the first tubular member is moving towards the second tubular member into the everting second tubular member; and
    continuing to feed the first tubular member into the lumen of the second tubular member as the second tubular member is everted into itself to envelop the first tubular member to form a cured in place liner with an outer impermeable layer encapsulating the first tubular member of resin impregnable material; and
    withdrawing the cured in place liner of first tubular member of resin impregnable material and outer second tubular member of resin impermeable material in the first direction.

2. The method of claim 1, further including the steps of:
    providing at least one additional length of resin impregnable material;
    feeding the additional resin impregnable material about the first tubular member;
    joining the additional resin impregnable material into a tube about the first tubular member prior to everting the second tubular member over the first tubular member.

3. The method of claim 2, including the step of impregnating the resin impregnable material.

4. The method of claim 1, wherein the second tubular member is formed by joining the planar edges of the material prior to everting the second tubular member over the first tubular member.

5. The method of claim 4, wherein the edges of the resin impermeable material are sealed by heat and pressure.

6. The method of claim 1, including the step of
    forming the resin impermeable material into a tubular member on a former pipe having an inlet end and an outlet end;
    passing the first tubular member of resin impregnable material into the inlet end of the former pipe;
    everting the outer tube of resin impermeable material about the first tubular member as it passes into the inlet end of the former pipe; and
    removing the wrapped tubular member as it exits the distal end of the former pipe.

7. The method of claim 6, including the step of impregnating the first tubular member prior to everting the outer tube over the first tubular member.

8. The method of claim 1, including the step of impregnating the first tubular member prior to everting the second tubular member over the first tubular member.

9. The method of claim 1, wherein the step of forming the second tubular member includes forming an edge seal on the outside of the tubular member and after the second tubular member is everted, the edge seal lies on the inside facing the first tubular member.

* * * * *